United States Patent
Everly et al.

(10) Patent No.: US 12,540,757 B2
(45) Date of Patent: Feb. 3, 2026

(54) HEATER BUNDLES WITH LOCAL POWER SWITCHING

(71) Applicant: Watlow Electric Manufacturing Company, St. Louis, MO (US)

(72) Inventors: Mark Everly, St. Charles, MO (US); Trevor Smith, O'Fallon, MO (US); Jacob Spooler, Maryland Heights, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1183 days.

(21) Appl. No.: 17/197,542

(22) Filed: Mar. 10, 2021

(65) Prior Publication Data

US 2021/0190379 A1 Jun. 24, 2021

Related U.S. Application Data (63) Continuation-in-part of application No. 16/272,668, filed on Feb. 11, 2019, now Pat. No. 11,781,784,
(Continued)

(51) Int. Cl.
*F24H 9/20* (2022.01)
*F24H 1/10* (2022.01)
(Continued)

(52) U.S. Cl.
CPC ............ *F24H 15/37* (2022.01); *F24H 1/103* (2013.01); *F24H 9/2028* (2013.01); *F24H 15/25* (2022.01);
(Continued)

(58) Field of Classification Search
None
See application file for complete search history.

(56) References Cited

U.S. PATENT DOCUMENTS

| 686,288 | A | * | 11/1901 | Griffing | ................. F22B 1/287 |
| | | | | | 392/399 |
| 710,429 | A | * | 10/1902 | Collins et al. | ....... A61N 1/0492 |
| | | | | | 307/132 R |

(Continued)

FOREIGN PATENT DOCUMENTS

| CN | 101142852 | 3/2008 |
| CN | 103826482 | 5/2014 |

(Continued)

OTHER PUBLICATIONS

Extended European Search Report issued in corresponding EP Application No. 22161471.2, issued Nov. 15, 2022, 11 pages.

(Continued)

*Primary Examiner* — Thor S Campbell
(74) *Attorney, Agent, or Firm* — Burris Law, PLLC (57) ABSTRACT

A heater system includes a heater bundle. The heater bundle includes at least one heater assembly, where the heater assembly includes a plurality of heater units, and more than one of the heater units defines at least one independently controlled heating zone. The heater bundle includes a plurality of power conductors electrically connected to the independently controlled heating zone. The heater system includes means for determining temperature and at least one power switch, the power switch disposed proximate the heater bundle. The heater system includes at least one controller configured to modulate power to the independently controlled heating zones through the power conductors based on the determined temperature to provide a desired power output along a length of the heater assembly. The controller is configured to provide power to the power switch.

19 Claims, 9 Drawing Sheets

Related U.S. Application Data which is a continuation of application No. 15/058,838, filed on Mar. 2, 2016, now Pat. No. 10,247,445.

(51) Int. Cl.

| | |
|---|---|
| *F24H 15/25* | (2022.01) |
| *F24H 15/37* | (2022.01) |
| *F24H 15/407* | (2022.01) |
| *F24H 15/45* | (2022.01) |
| *H05B 1/02* | (2006.01) |
| *H05B 3/04* | (2006.01) |
| *H05B 3/48* | (2006.01) |
| *H05B 3/82* | (2006.01) |
| *F24H 15/128* | (2022.01) |
| *F24H 15/269* | (2022.01) |
| *F24H 15/345* | (2022.01) |
| *F24H 15/421* | (2022.01) |

(52) U.S. Cl.
CPC .......... *F24H 15/407* (2022.01); *F24H 15/45* (2022.01); *H05B 1/0283* (2013.01); *H05B 3/04* (2013.01); *H05B 3/48* (2013.01); *H05B 3/82* (2013.01); *F24H 15/128* (2022.01); *F24H 15/269* (2022.01); *F24H 15/345* (2022.01); *F24H 15/421* (2022.01); *H05B 2203/014* (2013.01)

(56) References Cited

U.S. PATENT DOCUMENTS

| | | | | |
|---|---|---|---|---|
| 1,258,767 A * | 3/1918 | Hadaway, Jr. | ........... | H05B 3/80 392/501 |
| 1,320,890 A * | 11/1919 | Moffat | ........... | H01C 1/14 219/486 |
| 1,445,501 A * | 2/1923 | Dwinall | ........... | H05B 3/78 392/443 |
| 1,451,863 A * | 4/1923 | Clark | ........... | F24H 1/202 219/486 |
| 1,525,176 A * | 2/1925 | Givens | ........... | E21B 36/04 392/301 |
| 1,674,369 A * | 6/1928 | Mcquinn | ........... | F24H 1/202 392/452 |
| 1,680,104 A * | 8/1928 | Head | ........... | H05B 3/46 392/338 |
| 1,759,281 A * | 5/1930 | Rosenberger | ........... | F24H 1/102 392/500 |
| 1,787,450 A * | 1/1931 | Lonergan | ........... | F24H 9/2021 219/512 |
| 1,849,175 A * | 3/1932 | Clark | ........... | F24H 1/225 219/508 |
| 2,104,848 A * | 1/1938 | Clark | ........... | H01H 37/60 337/392 |
| 2,213,464 A * | 9/1940 | Fogwell | ........... | F24H 9/1818 392/500 |
| 2,375,871 A * | 5/1945 | Reifenberg | ........... | F24H 1/202 126/362.1 |
| 2,437,262 A * | 3/1948 | Levitt | ........... | F24H 9/2021 219/486 |
| 2,498,054 A * | 2/1950 | Taylor | ........... | H05B 1/0277 219/486 |
| 3,340,382 A * | 9/1967 | Lennox | ........... | H05B 3/82 219/544 |
| 3,873,807 A * | 3/1975 | Mohr | ........... | F24H 1/225 392/338 |
| 4,011,430 A * | 3/1977 | Witkin | ........... | H05B 1/023 219/486 |
| 4,039,995 A | 8/1977 | Walton et al. | | |
| 4,090,062 A * | 5/1978 | Phillips | ........... | H02J 3/14 219/486 |
| 4,132,262 A * | 1/1979 | Wibell | ........... | F25D 17/02 165/206 |
| 4,185,187 A * | 1/1980 | Rogers | ........... | F24H 15/37 392/471 |
| 4,567,350 A * | 1/1986 | Todd, Jr. | ........... | F24H 15/219 392/489 |
| 4,908,498 A * | 3/1990 | Kivela | ........... | G05D 23/1917 219/486 |
| 5,023,430 A * | 6/1991 | Brekkestran | ........... | A41D 13/0051 219/486 |
| 5,105,067 A * | 4/1992 | Brekkestran | ........... | G05D 23/1934 219/486 |
| 5,197,375 A * | 3/1993 | Rosenbrock | ........... | G05D 23/22 99/335 |
| 5,280,422 A | 1/1994 | Moe et al. | | |
| 5,831,250 A * | 11/1998 | Bradenbaugh | ........... | H05B 1/0283 219/494 |
| 5,835,349 A * | 11/1998 | Giannatto | ........... | H05K 7/202 165/104.33 |
| 5,844,211 A * | 12/1998 | Henry | ........... | H05B 3/82 219/386 |
| 6,289,177 B1 * | 9/2001 | Finger | ........... | H05B 3/06 392/455 |
| 6,363,216 B1 * | 3/2002 | Bradenbaugh | ........... | F24H 1/202 219/441 |
| 6,374,046 B1 * | 4/2002 | Bradenbaugh | ........... | F24H 15/407 219/492 |
| 6,424,801 B1 * | 7/2002 | Rabadi | ........... | F24H 1/102 392/450 |
| 6,509,550 B1 * | 1/2003 | Li | ........... | A47J 37/0629 219/386 |
| 6,566,633 B2 * | 5/2003 | Kitada | ........... | G05D 23/1934 219/486 |
| 6,573,483 B1 * | 6/2003 | DeCobert | ........... | A47J 36/32 219/494 |
| 6,946,626 B2 * | 9/2005 | Hirayama | ........... | G05B 15/02 219/492 |
| 7,257,464 B2 * | 8/2007 | Fennewald | ........... | H05B 1/02 700/297 |
| 7,312,425 B2 * | 12/2007 | DeCobert | ........... | A47J 27/004 219/442 |
| 8,219,258 B1 * | 7/2012 | Almeida | ........... | G05B 15/02 700/297 |
| 9,065,294 B2 * | 6/2015 | Kambara | ........... | H02J 13/00004 |
| 10,448,458 B2 | 10/2019 | Ohse et al. | | |
| 2002/0011480 A1 * | 1/2002 | Schilling | ........... | H05B 3/746 219/448.11 |
| 2002/0015585 A1 * | 2/2002 | Jensen | ........... | H05B 3/82 392/501 |
| 2002/0040898 A1 * | 4/2002 | Von Arx | ........... | B29C 65/3448 219/535 |
| 2003/0021597 A1 * | 1/2003 | Chu | ........... | F24H 15/414 392/390 |
| 2004/0039487 A1 | 2/2004 | Fennewald et al. | | |
| 2005/0067405 A1 * | 3/2005 | DeAngelis | ........... | H05B 3/34 219/549 |
| 2012/0237192 A1 * | 9/2012 | Kominami | ........... | B60H 1/2221 392/480 |
| 2013/0094840 A1 * | 4/2013 | Seitz | ........... | F24H 1/202 392/449 |
| 2013/0243411 A1 * | 9/2013 | Kominami | ........... | F24H 3/085 392/482 |
| 2013/0255739 A1 * | 10/2013 | Kossakovski | ........... | H10N 10/17 136/201 |
| 2015/0276263 A1 * | 10/2015 | Hayakawa | ........... | F24H 3/002 392/360 |
| 2017/0254564 A1 | 9/2017 | Everly et al. | | |
| 2017/0254565 A1 | 9/2017 | Everly et al. | | |
| 2020/0056811 A1 | 2/2020 | Erbe et al. | | |
| 2020/0232677 A1 | 7/2020 | Everly et al. | | |
| 2021/0018221 A1 | 1/2021 | Nolte et al. | | |
| 2021/0283614 A1 * | 9/2021 | Fuller | ........... | B01L 7/00 |
| 2023/0389229 A1 * | 11/2023 | Buchert | ........... | H05K 5/061 |

(56) References Cited

U.S. PATENT DOCUMENTS

2024/0260228 A1\* 8/2024 Chuang .............. H05K 7/20236
2025/0081396 A1\* 3/2025 Zhang ................ H05K 7/20781

FOREIGN PATENT DOCUMENTS

| | | |
|---|---|---|
| CN | 104025702 | 9/2014 |
| DE | 2400478 A1 | 7/1975 |
| EP | 3737206 | 11/2020 |
| JP | H02192561 A | 7/1990 |
| JP | 2005340745 A | 12/2005 |
| JP | 2013121785 A | 6/2013 |
| JP | 2020088180 A | 6/2020 |
| KR | 2020140004692 | 8/2014 |
| KR | 1020200057687 A | 5/2020 |
| KR | 1020210024990 A | 3/2021 |
| WO | 2004019143 | 3/2004 |
| WO | 2013033402 | 3/2013 |
| WO | 2013034458 | 3/2013 |
| WO | 2017151772 A1 | 9/2017 |
| WO | 2018009768 A1 | 1/2018 |
| WO | 2020246613 A1 | 12/2020 |

OTHER PUBLICATIONS

First Examination Report issued in Indian counterpart Application No. 202214012840, mailed Sep. 28, 2022, 5 pages.
Office Action issued in corresponding KR Application No. 10-2022-0029695, issued Nov. 16, 2025, 11 pages.
Office Action issued in corresponding JP Application No. 2022-037253, issued Dec. 2, 2025, and an English translation, 13 pages.

\* cited by examiner

HEATER BUNDLES WITH LOCAL POWER SWITCHING

CROSS-REFERENCE TO RELATED APPLICATIONS

The present application is a continuation-in-part application of U.S. Ser. No. 16/272,668, filed Feb. 11, 2019, and titled "Heater Bundle for Adaptive Control," which is a continuation application of U.S. Ser. No. 15/058,838, now U.S. Pat. No. 10,247,445, filed Mar. 2, 2016. The contents of the above disclosures are incorporated herein by reference in their entirety.

FIELD

The present disclosure relates to electric heaters, and more particularly to heaters for heating a fluid flow such as heat exchangers.

BACKGROUND

The statements in this section merely provide background information related to the present disclosure and may not constitute prior art.

A fluid heater may be in the form of a cartridge heater, which has a rod configuration to heat fluid that flows along or past an exterior surface of the cartridge heater. The cartridge heater may be disposed inside a heat exchanger for heating the fluid flowing through the heat exchanger. If the cartridge heater is not properly sealed, moisture and fluid may enter the cartridge heater to contaminate the insulation material that electrically insulates a resistive heating element from the metal sheath of the cartridge heater, resulting in dielectric breakdown and consequently heater failure. The moisture can also cause short circuiting between power conductors and the outer metal sheath. The failure of the cartridge heater may cause costly downtime of the apparatus that uses the cartridge heater.

SUMMARY

The present disclosure provides a heater system that includes a heater bundle. The heater bundle includes at least one heater assembly, where more than one of the heater assemblies includes a plurality of heater units, and more than one of the heater units defining at least one independently controlled heating zone. The heater bundle includes a plurality of power conductors electrically connected to the independently controlled heating zones. The heater system includes means for determining temperature and at least one power switch disposed proximate the heater bundle. The heater system includes at least one controller configured to provide a control signal to the at least one power switch such that the power switch modulates power to the independently controlled heating zones through the power conductors based on the determined temperature to provide a desired power output along a length of more than one of the heater assemblies.

In variations of the present disclosure, which may be implemented individually or in any combination: the at least one power switch is disposed within an enclosure; the heater system further includes a temperature regulation device that cools the enclosure; the temperature regulation device cools the enclosure using a liquid; the temperature regulation device cools the enclosure using forced air; the forced air is provided inside the enclosure and outside the enclosure; the enclosure is sealed from an outside atmosphere; the temperature regulation device cools the enclosure using an interior fluid cooling flow and an external fluid cooling flow, each of the cooling flows being coupled by a heat exchanger; the temperature regulation device cools the enclosure using at least one of a thermoelectric element and a refrigeration system; the at least one controller is disposed within the enclosure; the at least one controller is remote from the heater bundle and communicates with the one or more power switches through at least one of wirelessly and over the plurality of power conductors; and a heat sink is disposed proximate the at least one power switch.

In another form, a heater system includes a heater bundle, and the heater bundle includes at least one heater assembly, where more than one of the heater assemblies includes a plurality of heater units, and more than one of the heater units defining at least one independently controlled heating zone. The heater bundle includes a plurality of power conductors electrically connected to the independently controlled heating zones. The heater system includes means for determining at least one of heating conditions and heating requirements. The heater system includes at least one power switch disposed proximate the heater bundle. The heater system includes at least one controller configured to provide a control signal to the at least one power switch such that the power switch modulates power to the independently controlled heating zones through the power conductors based on the at least one of heating conditions and heating requirements to provide a desired power output along a length of more than one of the heater assemblies.

In variations of this form, which may be implemented individually or in any combination: the heater system includes an enclosure and the at least one power switch is disposed within the enclosure; the at least one controller is disposed within the enclosure; the at least one controller is remote from the heater bundle and communicates with the one or more power switches through at least one of wirelessly and over the plurality of power conductors; the at least one of heating conditions and heating requirements are selected from the group consisting of life of the heater units, reliability of the heater units, sizes of the heater units, costs of the heater units, local heater flux, characteristics and operation of the heater units, and entire power output; and a heat sink is disposed proximate the at least one power switch.

In yet another form, a heater system includes a heater assembly having a plurality of heater units, each heater unit defining at least one independently controlled heating zone. The heater assembly includes a plurality of power conductors electrically connected to the heater units. The heater system includes at least one power switch disposed proximate the heater assembly. The heater system includes at least one controller configured to provide a control signal to the at least one power switch such that the power switch modulates power to the independently controlled heating zones through the power conductors based on at least one of heating conditions and heating requirements to provide a desired power output along a length of the heater assembly.

In variations of this form, which may be implemented individually or in any combination: the heater system includes a means for determining temperature; the heater system includes a means for determining heating conditions or heating requirements; and a heat sink is disposed proximate the at least one power switch.

The present disclosure also provides an apparatus for heating fluid. The apparatus includes a sealed housing defining an internal chamber and having a fluid inlet and a fluid outlet. The apparatus includes a heater system that includes a heater assembly. The heater assembly includes a plurality of heater units, each heater unit defining at least one independently controlled heating zone. The heater assembly includes a plurality of power conductors electrically connected to the heater units. The heater system includes at least one power switch disposed proximate the heater assembly. The heater system includes at least one controller configured to modulate power to the independently controlled heating zones of the heater units through the power conductors based on at least one of heating conditions and heating requirements to provide a desired power output along a length of the heater assembly. The controller is configured to provide power to the at least one power switch The heater assembly is disposed within the internal chamber of the housing, and the heater assembly is adapted to provide a predetermined heat distribution to a fluid within the housing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
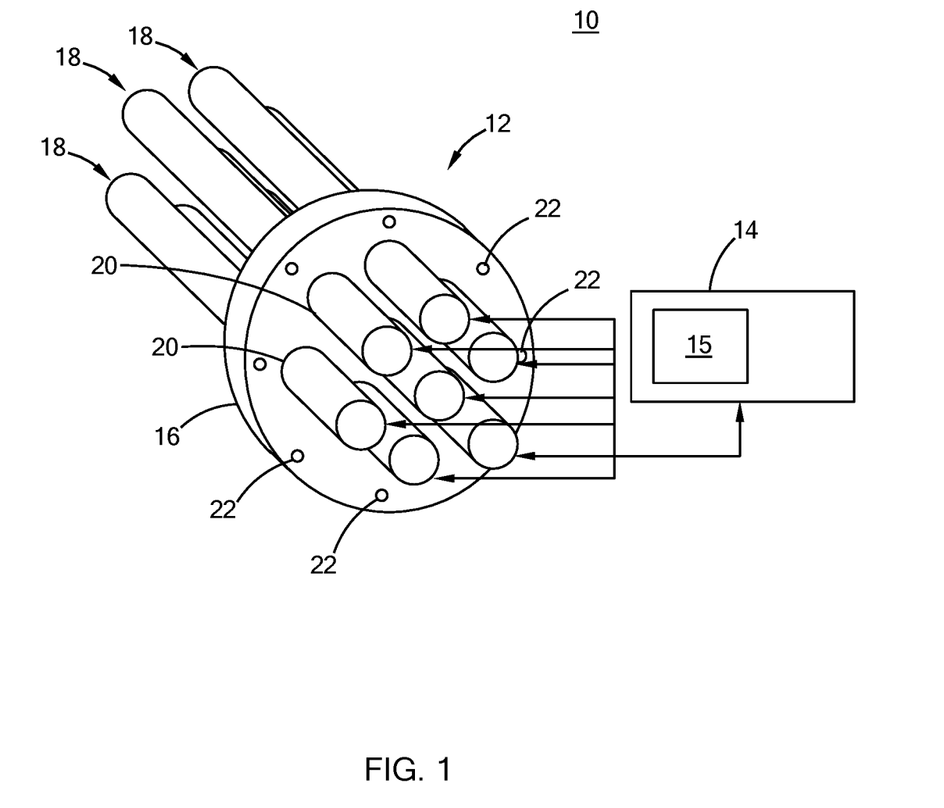
FIG. 1 is a perspective view of a heater bundle constructed in accordance with the teachings of the present disclosure.

Referring to FIG. 1, a heater system constructed in accordance with the teachings of the present disclosure is generally indicated by reference numeral 10. The heater system 10 includes a heater bundle 12 and a power supply device 14 electrically connected to the heater bundle 12. The power supply device 14 includes a controller 15 for controlling power supply to the heater bundle 12. A "heater bundle", as used in the present disclosure, refers to a heater apparatus including two or more physically distinct heating devices that can be independently controlled. Therefore, when one of the heating devices in the heater bundle fails or degrades, the remaining heating devices in the heater bundle 12 can continue to operate.

In one form, the heater bundle 12 includes a mounting flange 16 and a plurality of heater assemblies 18 secured to the mounting flange 16. The mounting flange 16 includes a plurality of apertures 20 through which the heater assemblies 18 extend. Although the heater assemblies 18 are arranged to be parallel in this form, it should be understood that alternate positions/arrangements of the heater assemblies 18 are within the scope of the present disclosure.

As further shown, the mounting flange 16 includes a plurality of mounting holes 22. By using screws or bolts (not shown) through the mounting holes 22, the mounting flange 16 may be assembled to a wall of a vessel or a pipe (not shown) that carries a fluid to be heated. At least a portion of the heater assemblies 18 are be immersed in the fluid inside the vessel or pipe to heat the fluid in this form of the present disclosure.

Figure 2:
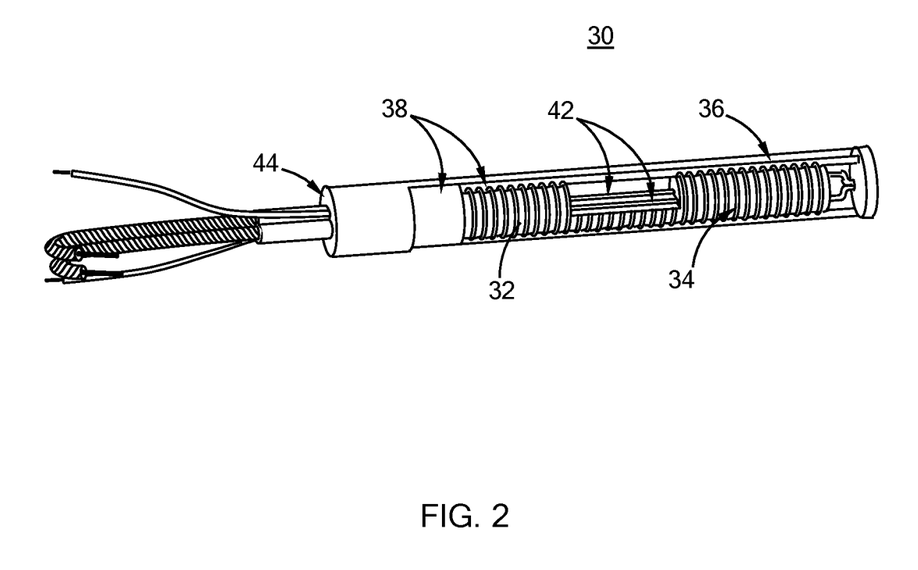
FIG. 2 is a perspective view of a heater assembly of the heater bundle of FIG. 1 in accordance with the teachings of the present disclosure.

Referring to FIG. 2, the heater assemblies 18 according to one form may be in the form of a cartridge heater 30. The cartridge heater 30 is a tube-shaped heater that generally includes a core body 32, a resistive heating wire 34 wrapped around the core body 32, a metal sheath 36 enclosing the core body 32 and the resistive heating wire 34 therein, and an insulating material 38 filling in the space in the metal sheath 36 to electrically insulate the resistive heating wire 34 from the metal sheath 36 and to thermally conduct the heat from the resistive heating wire 34 to the metal sheath 36. The core body 32 may be made of ceramic. The insulation material 38 may be compacted Magnesium Oxide (MgO). A plurality of power conductors 42 extend through the core body 32 along a longitudinal direction and are electrically connected to the resistive heating wires 34. The power conductors 42 also extend through an end piece 44 that seals the metal sheath 36. The power conductors 42 are connected to the power supply device 14 (shown in FIG. 1) to supply power from the power supply device 14 to the resistive heating wire 34. While FIG. 2 shows only two power conductors 42 extending through the end piece 44, more than two power conductors 42 can extend through the end piece 44. The power conductors 42 may be in the form of conductive pins. Various constructions and further structural and electrical details of cartridge heaters are set forth in greater detail in U.S. Pat. Nos. 2,831,951 and 3,970,822, which are commonly assigned with the present application and the contents of which are incorporated herein by reference in their entirety. Therefore, it should be understood that the form illustrated herein is merely exemplary and should not be construed as limiting the scope of the present disclosure.

Alternatively, multiple resistive heating wires 34 and multiple pairs of power conductors 42 may be used to form multiple heating circuits that can be independently controlled to enhance reliability of the cartridge heater 30. Therefore, when one of the resistive heating wires 34 fails, the remaining resistive wires 34 may continue to generate heat without causing the entire cartridge heater 30 to fail and without causing costly machine downtime.

Figure 3:
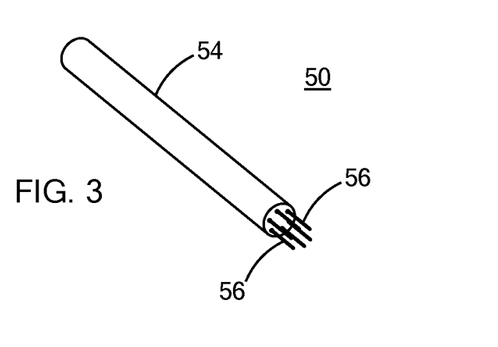
FIG. 3 is a perspective view of a variant of a heater assembly of the heater bundle of FIG. 1 in accordance with the teachings of the present disclosure.
Figure 4:
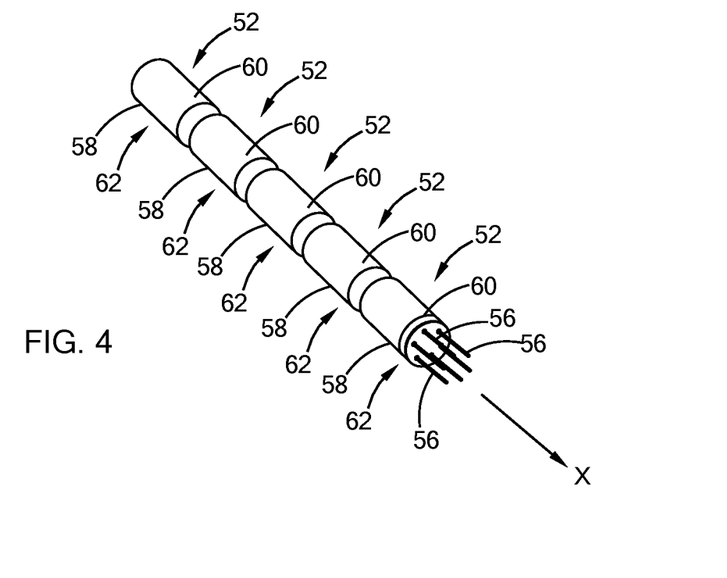
FIG. 4 is a perspective view of the heater assembly of FIG. 3 in accordance with the teachings of the present disclosure, wherein the outer sheath of the heater assembly is removed for clarity.
Figure 5:
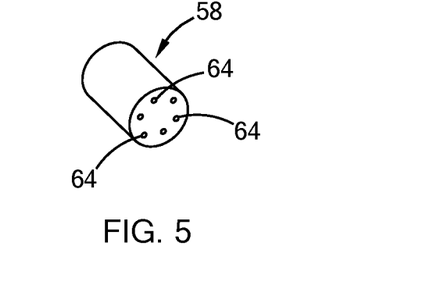
FIG. 5 is a perspective view of a core body of the heater assembly of FIG. 3 in accordance with the teachings of the present disclosure.

Referring to FIGS. 3 to 5, the heater assemblies 50 may be in the form of a cartridge heater having a configuration similar to that of FIG. 2 except for the number of core bodies and number of power conductors used. More specifically, the heater assemblies 50 each include a plurality of heater units 52, and an outer metal sheath 54 enclosing the plurality of heater units 52 therein, along with a plurality of power conductors 56. An insulating material (not shown in FIGS. 3 to 5) is provided between the plurality of heating units 52 and the outer metal sheath 54 to electrically insulate the heater units 52 from the outer metal sheath 54. The plurality of heater units 52 each include a core body 58 and a resistive heating element 60 surrounding the core body 58. The resistive heating element 60 of each heater unit 52 may define one or more heating circuits to define one or more heating zones 62.

In the present form, each heater unit 52 defines one heating zone 62 and the plurality of heater units 52 in each heater assembly 50 are aligned along a longitudinal direction X. Therefore, each heater assembly 50 defines a plurality of heating zones 62 aligned along the longitudinal direction X. The core body 58 of each heater unit 52 defines a plurality of through holes/apertures 64 to allow power conductors 56 to extend therethrough. The resistive heating elements 60 of the heater units 52 are connected to the power conductors 56, which, in turn, are connected to a power supply device 14. The power conductors 56 supply the power from the power supply device 14 to the plurality of heater units 52. By properly connecting the power conductors 56 to the resistive heating elements 60, the resistive heating elements 60 of the plurality of heater units 52 can be independently controlled by the controller 15 of the power supply device 14. As such, failure of one resistive heating element 60 for a particular heating zone 62 will not affect the proper functioning of the remaining resistive heating elements 60 for the remaining heating zones 62. Further, the heater units 52 and the heater assemblies 50 may be interchangeable for ease of repair or assembly.

In the present form, six power conductors 56 are used for each heater assembly 50 to supply power to five independent electrical heating circuits on the five heater units 52. Alternatively, six power conductors 56 may be connected to the resistive heating elements 60 in a way to define three fully independent circuits on the five heater units 52. It is possible to have any number of power conductors 56 to form any number of independently controlled heating circuits and independently controlled heating zones 62. For example, seven power conductors 56 may be used to provide six heating zones 62. Eight power conductors 56 may be used to provide seven heating zones 62.

The power conductors 56 may include a plurality of power supply and power return conductors, a plurality of power return conductors and a single power supply conductor, or a plurality of power supply conductors and a single power return conductor. If the number of heating zones is n, the number of power supply and return conductors is n+1.

Alternatively, a higher number of electrically distinct heating zones 62 may be created through multiplexing, polarity sensitive switching and other circuit topologies by the controller 15 of the power supply device 14. Use of multiplexing or various arrangements of thermal arrays to increase the number of heating zones within the cartridge heater 30 for a given number of power conductors (e.g. a cartridge heater with six power conductors for 15 or 30 zones.) is disclosed in U.S. Pat. Nos. 9,123,755, 9,123,756, 9,177,840, 9,196,513, and their related applications, which are commonly assigned with the present application and the contents of which are incorporated herein by reference in their entirety.

With this structure, each heater assembly 50 includes a plurality of heating zones 62 that can be independently controlled to vary the power output or heat distribution along the length of the heater assembly 50. The heater bundle 12 includes a plurality of such heater assemblies 50. Therefore, the heater bundle 12 provides a plurality of heating zones 62 and a tailored heat distribution for heating the fluid that flows through the heater bundle 12 to be adapted for specific applications. The power supply device 14 can be configured to modulate power to each of the independently controlled heating zones 62.

For example, a heating assembly 50 may define an "m" heating zones, and the heater bundle may include "k" heating assemblies 50. Therefore, the heater bundle 12 may define m×k heating zones. The plurality of heating zones 62 in the heater bundle 12 can be individually and dynamically controlled in response to heating conditions and/or heating requirements, including but not limited to, the life and the reliability of the individual heater units 52, the sizes and costs of the heater units 52, local heater flux, characteristics and operation of the heater units 52, and the entire power output.

Each circuit, or selected heating zone, is individually controlled at a desired temperature or a desired power level so that the distribution of temperature and/or power adapts to variations in system parameters (e.g. manufacturing variation/tolerances, changing environmental conditions, changing inlet flow conditions such as inlet temperature, inlet temperature distribution, flow velocity, velocity distribution, fluid composition, fluid heat capacity, etc.). More specifically, the heater units 52 may not generate the same heat output when operated under the same power level due to manufacturing variations as well as varied degrees of heater degradation over time. The heater units 52 may be independently controlled to adjust the heat output according to a desired heat distribution. The individual manufacturing tolerances of components of the heater system and assembly tolerances of the heater system are increased as a function of the modulated power of the power supply, or in other words, because of the high fidelity of heater control, manufacturing tolerance of individual components need not be as tight/narrow.

The heater units 52 may each include a temperature sensor (not shown) for measuring the temperature of the heater units 52. When a hot spot in the heater units 52 is detected, the power supply device 14 may reduce or turn off the power to the particular heater unit 52 on which the hot spot is detected to avoid overheating or failure of the particular heater unit 52. The power supply device 14 may modulate the power to the heater units 52 adjacent to the disabled heater unit 52 to compensate for the reduced heat output from the particular heater unit 52.

The power supply device 14 may include multi-zone algorithms to turn off or turn down the power level delivered to any particular zone, and to increase the power to the heating zones adjacent to the particular heating zone that is disabled and has a reduced heat output. By carefully modulating the power to each heating zone, the overall reliability of the system can be improved. By detecting the hot spot and controlling the power supply accordingly, the heater system 10 has improved safety.

The heater bundle 12 with the multiple independently controlled heating zones 62 can accomplish improved heating. For example, some circuits on the heater units 52 may be operated at a nominal (or "typical") duty cycle of less than 100% (or at an average power level that is a fraction of the power that would be produced by the heater with line voltage applied). The lower duty cycles allow for the use of resistive heating wires with a larger diameter, thereby improving reliability.

Normally, smaller zones would employ a finer wire size to achieve a given resistance. Variable power control allows a larger wire size to be used, and a lower resistance value can be accommodated, while protecting the heater from overloading with a duty cycle limit tied to the power dissipation capacity of the heater.

The use of a scaling factor may be tied to the capacity of the heater units 52 or the heating zone 62. The multiple heating zones 62 allow for more accurate determination and control of the heater bundle 12. The use of a specific scaling factor for a particular heating circuit/zone will allow for a more aggressive (i.e. higher) temperature (or power level) at almost all zones, which, in turn, lead to a smaller, less costly design for the heater bundle 12. Such a scaling factor and method is disclosed in U.S. Pat. No. 7,257,464, which is commonly assigned with the present application and the contents of which are incorporated herein by reference in its entirety.

The sizes of the heating zones controlled by the individual circuits can be made equal or different to reduce the total number of zones needed to control the distribution of temperature or power to a desired accuracy.

Referring back to FIG. 1, the heater assemblies 18 are shown to be a single end heater, i.e., the conductive pin extends through only one longitudinal end of the heater assemblies 18. The heater assembly 18 may extend through the mounting flange 16 or a bulkhead (not shown) and sealed to the flange 16 or bulkhead. As such, the heater assemblies 18 can be individually removed and replaced without removing the mounting flange 16 from the vessel or tube.

Alternatively, the heater assembly 18 may be a "double ended" heater. In a double-ended heater, the metal sheath are bent into a hairpin shape and the power conductors pass through both longitudinal ends of the metal sheath so that both longitudinal ends of the metal sheath pass through and are sealed to the flange or bulkhead. In this structure, the flange or the bulkhead need to be removed from the housing or the vessel before the individual heater assembly 18 can be replaced.

Figure 6:
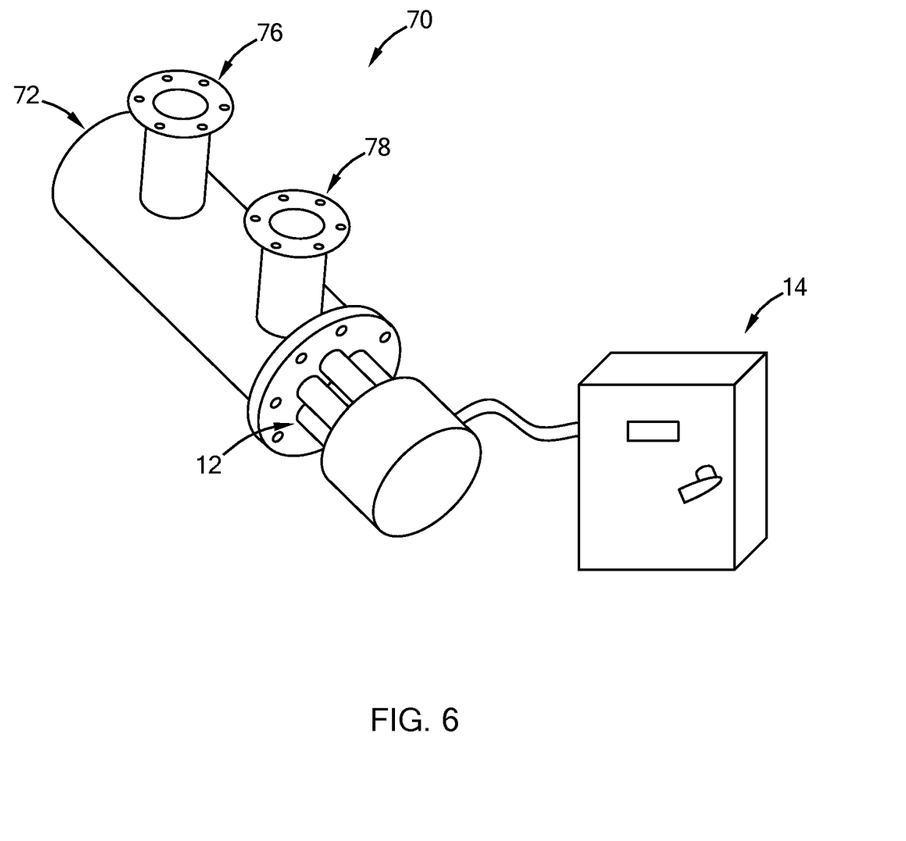
FIG. 6 is a perspective view of a heat exchanger including the heater bundle of FIG. 1 in accordance with the teachings of the present disclosure, wherein the heater bundle is partially disassembled from the heat exchanger to expose the heater bundle for illustration purposes.

Referring to FIG. 6, a heater bundle 12 is incorporated in a heat exchanger 70. The heat exchanger 70 includes a sealed housing 72 defining an internal chamber (not shown), a heater bundle 12 disposed within the internal chamber of the housing 72. The sealed housing 72 includes a fluid inlet 76 and a fluid outlet 78 through which fluid is directed into and out of the internal chamber of the sealed housing 72. The fluid is heated by the heater bundle 12 disposed in the sealed housing 72. The heater bundle 12 may be arranged for either cross-flow or for flow parallel to their length.

The heater bundle 12 is connected to a power supply device 14 which may include a means to modulate power, such as a switching means or a variable transformer, to modulate the power supplied to an individual zone. The power modulation may be performed as a function of time or based on detected temperature of each heating zone.

The resistive heating wire may also function as a sensor using the resistance of the resistive wire to measure the temperature of the resistive wire and using the same power conductors to send temperature measurement information to the power supply device 14. A means of sensing temperature for each zone would allow the control of temperature along the length of each heater assembly 18 in the heater bundle 12 (down to the resolution of the individual zone). Therefore, the additional temperature sensing circuits and sensing means can be dispensed with, thereby reducing the manufacturing costs. Direct measurement of the heater circuit temperature is a distinct advantage when trying to maximize heat flux in a given circuit while maintaining a desired reliability level for the system because it eliminates or minimizes many of the measurement errors associated with using a separate sensor. The heating element temperature is the characteristic that has the strongest influence on heater reliability. Using a resistive element to function as both a heater and a sensor is disclosed in U.S. Pat. No. 7,196,295, which is commonly assigned with the present application and the contents of which are incorporated herein by reference in its entirety.

Alternatively, the power conductors 56 may be made of dissimilar metals such that the power conductors 56 of dissimilar metals may create a thermocouple for measuring the temperature of the resistive heating elements. For example, at least one set of a power supply and a power return conductor may include different materials such that a junction is formed between the different materials and a resistive heating element of a heater unit and is used to determine temperature of one or more zones. Use of "integrated" and "highly thermally coupled" sensing, such as using different metals for the heater leads to generation of a thermocouple-like signal. The use of the integrated and coupled power conductors for temperature measurement is disclosed in U.S. application Ser. No. 14/725,537, which is commonly assigned with the present application and the contents of which are incorporated herein by reference in its entirety.

The controller 15 for modulating the electrical power delivered to each zone may be a closed-loop automatic control system. The closed-loop automatic control system receives the temperature feedback from each zone and automatically and dynamically controls the delivery of power to each zone, thereby automatically and dynamically controlling the power distribution and temperature along the length of each heater assembly 18 in the heater bundle 12 without continuous or frequent human monitoring and adjustment.

The heater units 52 as disclosed herein may also be calibrated using a variety of methods including but not limited to energizing and sampling each heater unit 52 to calculate its resistance. The calculated resistance can then be compared to a calibrated resistance to determine a resistance ratio, or a value to then determine actual heater unit temperatures. Exemplary methods are disclosed in U.S. Pat. Nos. 5,280,422 and 5,552,998, which are commonly assigned with the present application and the contents of which are incorporated herein by reference in their entirety.

One form of calibration includes operating the heater system 10 in at least one mode of operation, controlling the heater system 10 to generate a desired temperature for at least one of the independently controlled heating zones 62, collecting and recording data for the at least one independently controlled heating zones 62 for the mode of operation, then accessing the recorded data to determine operating specifications for a heating system having a reduced number of independently controlled heating zones, and then using the heating system with the reduced number of independently controlled heating zones. The data may include, by way of example, power levels and/or temperature information, among other operational data from the heater system 10 having its data collected and recorded.

In a variation of the present disclosure, the heater system may include a single heater assembly 18, rather than a plurality of heater assemblies in a heater bundle 12. The single heater assembly 18 would comprise a plurality of heater units 52, each heater unit 52 defining at least one independently controlled heating zone. Similarly, power conductors 56 are electrically connected to each of the independently controlled heating zones 62 in each of the heater units 52, and the power supply device is configured to modulate power to each of the independently controlled heater zones 62 of the heater units through the power conductors 56.

Figure 7:
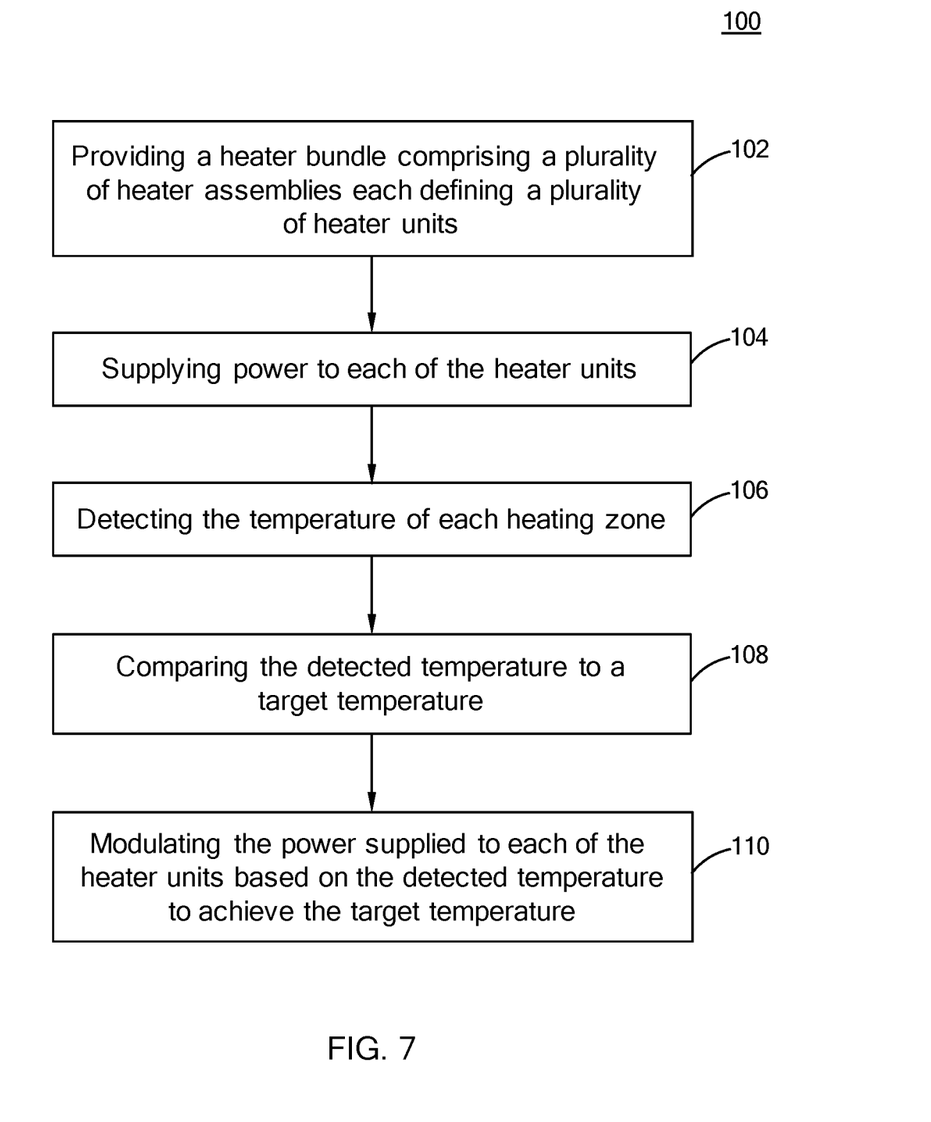
FIG. 7 is a block diagram of a method of operating a heater system including a heater bundle constructed in accordance with the teachings of the present disclosure.

Referring to FIG. 7, a method 100 of controlling a heater system includes providing a heater bundle comprising a plurality of heater assemblies in step 102. Each heater assembly includes a plurality of heater units. Each heater unit defines at least one independently controlled heating circuit (and consequently heating zone). The power to each of the heater units is supplied through power conductors electrically connected to each of the independently controlled heating zones in each of the heater units in step 104. The temperature within each of the zones is detected in step 106. The temperature may be determined using a change in resistance of a resistive heating element of at least one of the heater units. The zone temperature may be initially determined by measuring the zone resistance (or, by measurement of circuit voltage, if appropriate materials are used).

The temperature values may be digitalized. The signals may be communicated to a microprocessor. The measured (detected) temperature values may be compared to a target (desired) temperature for each zone in step 108. The power supplied to each of the heater units may be modulated based on the measured temperature to achieve the target temperatures in step 110.

Optionally, the method may further include using a scaling factor to adjust the modulating power. The scaling factor may be a function of a heating capacity of each heating zone. The controller 15 may include an algorithm, potentially including a scaling factor and/or a mathematical model of the dynamic behavior of the system (including knowledge of the update time of the system), to determine the amount of power to be provided (via duty cycle, phase angle firing, voltage modulation or similar techniques) to each zone until the next update. The desired power may be converted to a signal, which is sent to a switch or other power modulating device for controlling power output to the individual heating zones.

In the present form, when at least one heating zone is turned off due to an anomalous condition, the remaining zones continue to provide a desired wattage without failure. Power is modulated to a functional heating zone to provide a desired wattage when an anomalous condition is detected in at least one heating zone. When at least one heating zone is turned off based on the determined temperature, the remaining zones continue to provide a desired wattage. The power is modulated to each of the heating zones as a function of at least one of received signals, a model, and as a function of time.

For safety or process control reasons, typical heaters are generally operated to be below a maximum allowable temperature in order to prevent a particular location of the heater from exceeding a given temperature due to unwanted chemical or physical reactions at the particular location, such as combustion/fire/oxidation, coking boiling etc.). Therefore, this is normally accommodated by a conservative heater design (e.g., large heaters with low power density and much of their surface area loaded with a much lower heat flux than might otherwise be possible).

However, with the heater bundle of the present disclosure, it is possible to measure and limit the temperature of any location within the heater down to a resolution on the order of the size of the individual heating zones. A hot spot large enough to influence the temperature of an individual circuit can be detected.

Since the temperature of the individual heating zones can be automatically adjusted and consequently limited, the dynamic and automatic limitation of temperature in each zone and all other zones to be operating at an optimum power/heat flux level without fear of exceeding the desired temperature limit in any zone. This brings an advantage in high-limit temperature measurement accuracy over the current practice of clamping a separate thermocouple to the sheath of one of the elements in a bundle. The reduced margin and the ability to modulate the power to individual zones can be selectively applied to the heating zones, selectively and individually, rather than applied to an entire heater assembly, thereby reducing the risk of exceeding a predetermined temperature limit.

The characteristics of the cartridge heater may vary with time. This time varying characteristic would otherwise require that the cartridge heater be designed for a single selected (worse-case) flow regime and therefore that the cartridge heater would operate at a sub-optimum state for other states of flow.

However, with dynamic control of the power distribution over the entire bundle down to a resolution of the core size due to the multiple heating units provided in the heater assembly, an optimized power distribution for various states of flow can be achieved, as opposed to only one power distribution corresponding to only one flow state in the typical cartridge heater. Therefore, the heater bundle of the present application allows for an increase in the total heat flux for all other states of flow.

Further, variable power control can increase heater design flexibility. The voltage can be de-coupled from resistance (to a great degree) in heater design and the heaters may be designed with the maximum wire diameter that can be fitted into the heater. It allows for increased capacity for power dissipation for a given heater size and level of reliability (or life of the heater) and allows for the size of the bundle to be decreased for a given overall power level. Power in this arrangement can be modulated by a variable duty cycle that is a part of the variable wattage controllers currently available or under development. The heater bundle can be protected by a programmable (or pre-programmed if desired) limit to the duty cycle for a given zone to prevent "overloading" the heater bundle.

Figure 8:
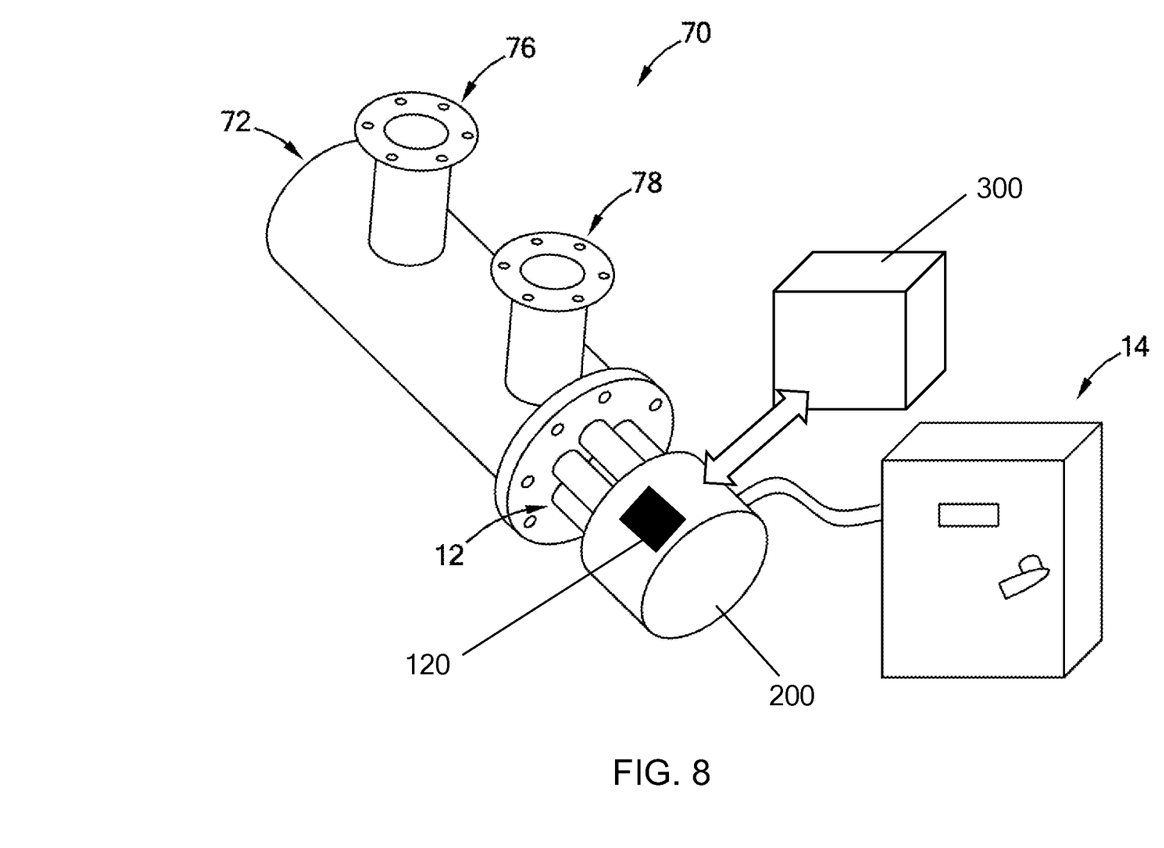
FIG. 8 is a perspective view of a heat exchanger including the heater bundle of FIG. 1, an enclosure, and a temperature regulation device in accordance with the teachings of the present disclosure.

With reference to FIG. 8, the heater system 10 as described above is incorporated into an example application of the heat exchanger 70. It should be understood that the heat exchanger 70 application is merely exemplary and should not be construed as limiting the application of the present disclosure. As shown, the heater system 10 includes at least one power switch 120 (shown schematically) disposed proximate, or near, the heater bundle 12. The controller 15 is configured to provide a control signal to the power switch 120 such that the power switch 120 modulates power to the independently controlled heating zones 62 (FIG. 4) through the power conductors 56 based on the determined temperature to provide a desired power output along a length of at least one of the heater assemblies 50.

With the power switch 120 proximate or near the heater bundle 12, as opposed to being at a remote location/cabinet, the number of individually isolated/insulated conductors that extend from the remote location/cabinet to the heater bundle 12 can be significantly reduced. Further, integrating switching for the heater assemblies 18 can reduce the number of conductors depending on the type of power being used (e.g., DC, single phase AC, 3-phase AC, and 3-phase AC with common and/or ground conductors, among others).

In one form, the power switch 120 is disposed within an enclosure 200, and the power conductors 56 are elongated outside a boundary of the heater assemblies 18 to extend into the enclosure 200 to be physically connected to the power switch 120. In one variation of the physical connection, the power conductors 56 may form either a pin or receptacle shape, while the mating power switch forms a receptacle or pin shape, respectively, for a "plug-in" style connection. Cooling can be provided to the enclosure 200 using an optional temperature regulation device 300 (also shown schematically). The enclosure 200 can be implemented in a variety of designs/geometries, (e.g., a junction box, a termination enclosure, among others) which are configured to enclose one or more electronic devices, including but not limited to the power switch 120, the controller 15 or other controller(s), associated electronics, and/or a wireless communication component, among others. With a wireless component, the controller 15 may be remote from the heater bundle 12 and communicate with the power switch 120 remotely. The controller 15 may also be remote and communicate with the power switch 120 over the power conductors 56. In one form, the enclosure 200 is sealed such that the components within are protected moisture intrusion and are sealed from an outside atmosphere. Further, the enclosure 200 protects the components within from damage during installation/operation/maintenance.

The temperature regulation device 300 can be implemented by any device/system that is configured to control the temperature of the enclosure 200. For example, the cooling may be provided by a liquid (e.g., radiator) or forced air, and the forced air may be inside the enclosure or outside the enclosure. In one variation, the enclosure in cooled by an interior fluid cooling flow and an external fluid cooling flow, each of the cooling flows being coupled by a heat exchanger. In still another variation, the enclosure is cooled by at least one of a thermoelectric element and a refrigeration system. In yet another form, a heat sink (e.g., extruded Al cooling fins) may be employed near or proximate the power switch 120, either alone or with the temperature regulation devices 300. Further specifics of exemplary temperature regulation devices 300 are described in greater detail below.

Figure 9:
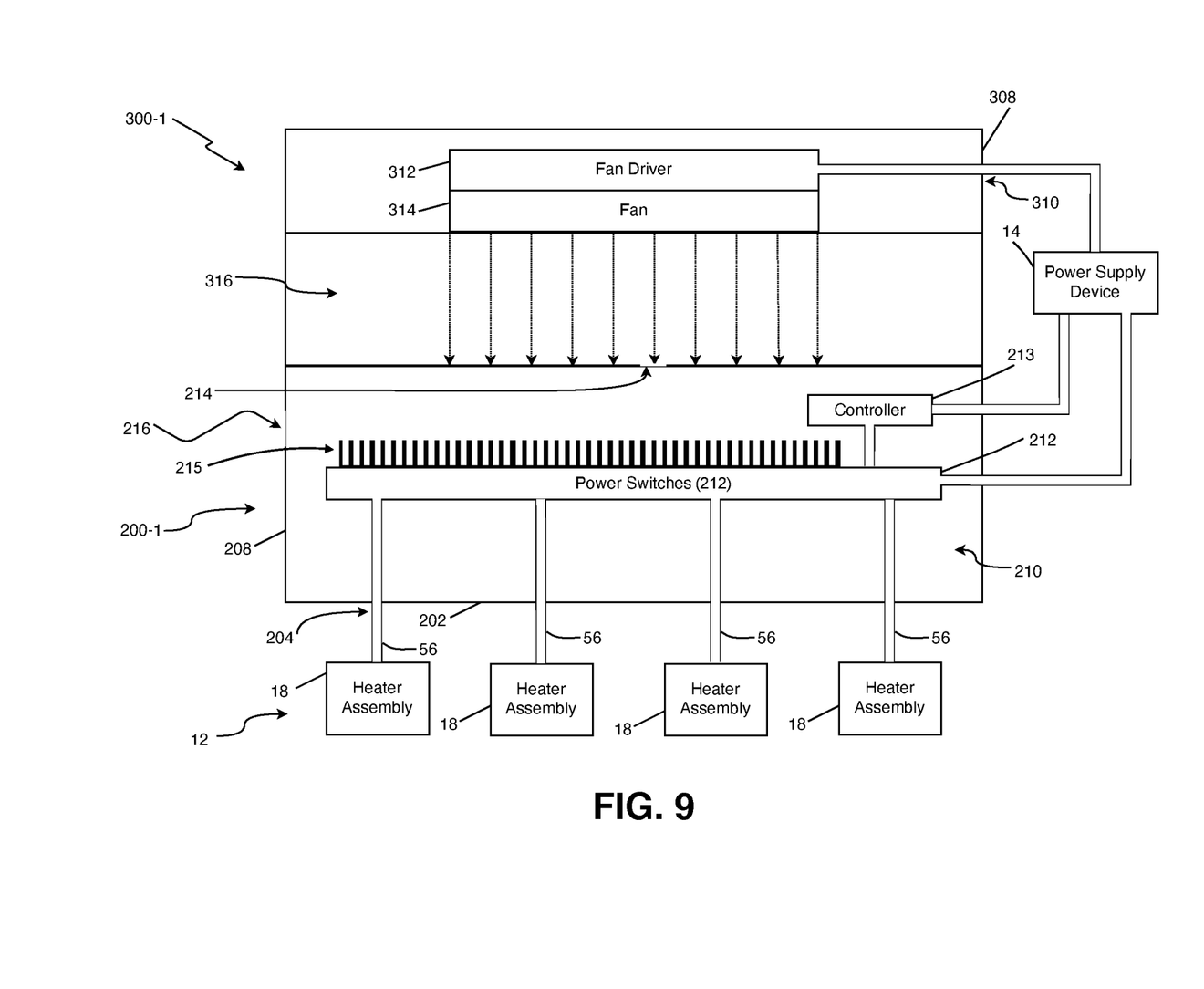
FIG. 9 is a block diagram of an enclosure and a temperature regulation device in accordance with the teachings of the present disclosure.

With reference to FIG. 9, an auxiliary heat exchanger 300-1, (as the temperature regulation device 300), and enclosure 200-1 are shown in a schematic format. In this form, the auxiliary heat exchanger 300-1 includes a housing 308, an aperture 310, a fan driver 312, a fan 314, and a chamber 316.

The enclosure 200-1 includes an interface surface 202, conductor aperture groups 204 extending through a thickness of a housing 208 (provided as individual apertures for ease of illustration), a chamber 210 defined by the housing 208, a ventilation aperture 214, and an outlet aperture 216. In one form, the enclosure 200-1 includes one or more power switches 212 and a controller 213 disposed within the chamber 210. As set forth above, an optional heat sink 215 is disposed proximate the power switches 212 to draw heat away from the power switches 212. In one form, the controller 213 is configured in a similar manner as the controller 15 when determining the control signal to be provided to the power switches 212 (via duty cycle, phase angle firing, voltage modulation or similar techniques) to each zone. As set forth above, the enclosure 200-1 (and thus the power switches 212) is disposed proximate to (e.g., adjacent and/or near) the one or more heater assemblies 18 of the heater bundle 12.

Figure 10:
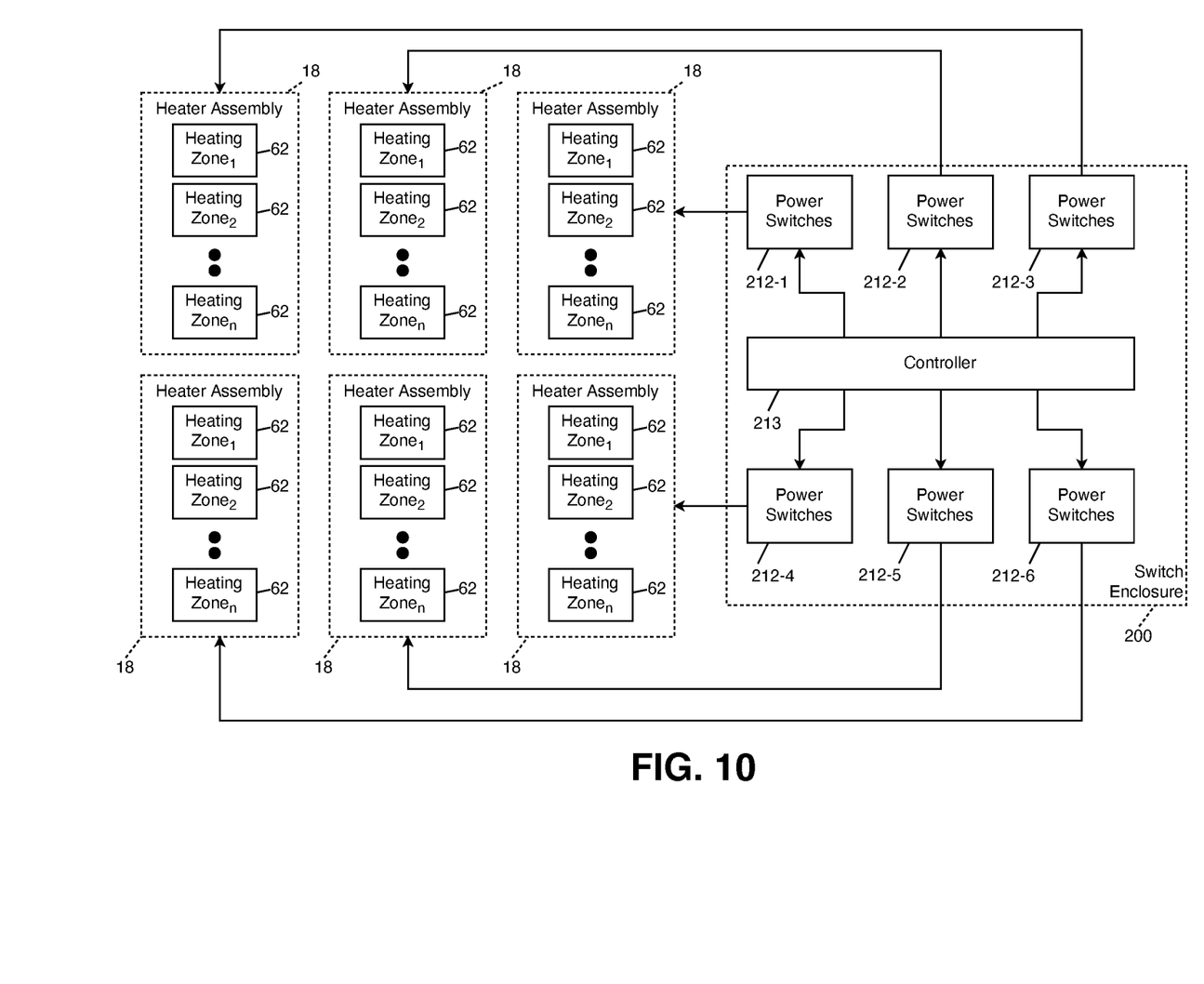
FIG. 10 is a block diagram of a plurality of power switching networks disposed within an enclosure and proximate to one or more heater assemblies in accordance with the teachings of the present disclosure.

In one form, the one or more power switches 212 are electrically coupled to the controller 213 and include, for example, a bipolar junction transistor (BJT), an insulated gate bipolar transistor (IGBT), a metal-oxide semiconductor field-effect transistor (MOSFET), addressable switches, an operational amplifier, transistor drivers, an integrated circuit, a combination thereof, and/or the like. In some forms, the number of the power switches 212 corresponds to the number of heating zones 62 of a respective heater assembly 18. As an example and as shown in FIG. 10, each of the heater assemblies 18 include n heating zones. As such, each of the power switches 212-1, 212-2, 212-3, 212-4, 212-5, 212-6 respectively include n power switches arranged in parallel to selectively and independently supply power to a respective heating zone 62 of the heater assembly 18. It should be understood that in other forms, each of the power switches 212-1, 212-2, 212-3, 212-4, 212-5, 212-6 may have other numbers and/or types of power switches to selectively and independently supply power to a respective heating zone 62 of the heater assembly 18 and is not limited to the example described herein.

Referring also to FIG. 10, the controller 213 is configured to selectively activate (or send a control signal to) the one or more power switches 212 and thereby selectively activate one or more heating zones 62 of at least one heater assembly 18. In one form, the controller 213 is configured to activate the one or more power switches 212 to allow power from the power supply device 14 to be provided to the heater assembly 18. As an example, to activate the power switches 212 (e.g., one or more BJTs), the controller 213 is configured to selectively provide a biasing voltage to the one or more power switches 212. In order to execute the functionality described herein, the controller 213 may be implemented by a microcontroller that includes one or more processor circuits configured to execute machine-readable instructions stored in one or more nontransitory computer-readable mediums, such as a random-access memory (RAM) circuit and/or a read-only memory (ROM) circuit. Furthermore, the controller 213 may include one or more voltage drivers for providing a biasing voltage to the one or more power switches 212.

While the controller 213 is shown as disposed within the chamber 210, in other forms, the controller 213 may be positioned externally from the chamber 210. Accordingly, the enclosure 200-1 may include a wireless communication circuit that enables the controller 213 to activate the one or more power switches 212, and the controller 213 may communicate with the wireless communication circuit via a wireless communication link (e.g., a Bluetooth communication link, a near-field communication (NFC) link, an ultrawide band (UWB) communication link, a wireless fidelity (WiFi) communication link, a Zigbee communication link, a cellular communication link, a long term evolution (LTE) communication link, a 5G communication link, and/or other similar wireless communication links). Furthermore, in one form, enclosure 200-1 includes an additional power supply system (e.g., an additional power supply and one or more power regulator circuits) electrically coupled to the wireless communication circuit and the one or more power switches 212 when the controller 213 is positioned externally from the enclosure 200-1 and when the one or more power switches 212 are not connected to the power supply device 14. Accordingly, the additional power supply system is configured to provide power to the one or more power switches 212 in response to the wireless communication circuit receiving a signal from the controller 213 to selectively activate the one or more power switches 212.

While the controller 213 and the controller 15 are illustrated and described as separate components, it should be understood that the functionality of the controller 213 may be performed by the controller 15, and vice versa, in other forms.

In one form and referring to FIG. 9, the auxiliary heat exchanger 300-1 may be an air-cooled heat exchanger that cools the enclosure 200-1 and the components therein using forced air. While the auxiliary heat exchanger 300-1 is illustrated as using forced air to cool the enclosure 200-1 and the components therein, it should be understood that the auxiliary heat exchanger 300-1 may be an induced air-cooled heat exchanger in other variations.

In one form, air flows into the chamber 316. The fan 314, in response to being activated by the fan driver 312, forces air toward an external surface of the housing 308, as indicated by the dotted arrows of FIG. 9. Furthermore, the fan 314 forces air into the chamber 210 via the ventilation aperture 214, as indicated by the dotted arrows of FIG. 9, to reduce the temperature of the components within the enclosure 200-1. Air that is forced into the chamber 210 the ventilation aperture 214 may exit the enclosure 200-1 via the outlet aperture 216. While FIG. 9 illustrates one ventilation aperture 214 and one outlet aperture 216, it should be understood that any number of ventilation apertures 214 and outlet apertures 216 may be included in other variations of the present disclosure. Furthermore, the ventilation aperture 214 and the outlet aperture 216 may be positioned at various locations of the housing 208 and are not limited to the specific illustrations herein.

In one form, the fan driver 312 includes one or more controllers, integrated circuits, power regulator circuits, and discrete electrical components that are configured to activate the fan 314. In one form, the fan driver 312 is electrically coupled to the power supply device 14 via a hardwire link (e.g., a twisted pair cable) that is at least partially disposed in the aperture 310. As an example, in response to receiving power from the power supply device 14, the fan driver 312 activates the fan 314.

Figure 11:
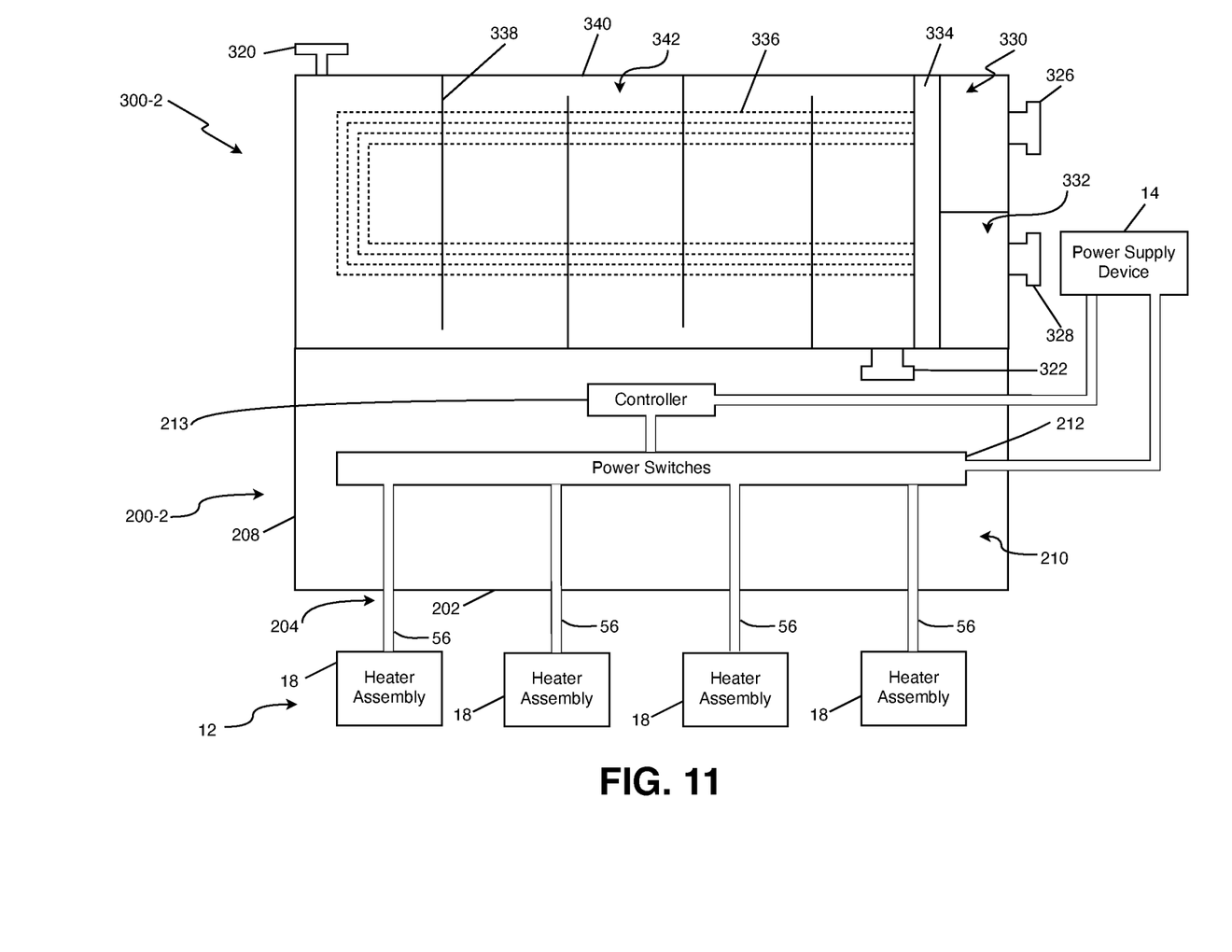
FIG. 11 is a block diagram of an enclosure and a temperature regulation device in accordance with the teachings of the present disclosure.

With reference to FIG. 11, a heat exchanger 300-2, as the temperature regulation device 300, and enclosure 200-2 are shown. The enclosure 200-2 is similar to the enclosure 200-1 described above, but in this form, the enclosure 200-2 does not include the ventilation aperture 214 and the outlet aperture 216. As such, the enclosure 200-2 is sealed from the heat exchanger 300-2.

In one form, the heat exchanger 300-2 defines an interior fluid system and an exterior fluid system, and the heat exchanger 300-2 includes an exterior fluid inlet 320, an exterior fluid outlet 322, an interior fluid inlet 326, an interior fluid outlet 328, an inlet plenum 330, an outlet plenum 332, a tube sheet 334, one or more interior fluid conduits 336, one or more baffles 338, a housing 340, and a chamber 342. In one form, the heat exchanger 300-2 is configured as a u-tube heat exchanger. It should be understood that the heat exchanger 300-2 may have various other configurations in other forms (e.g., a floating head heat exchanger, a straight-tube heat exchanger, among others) and is not limited to the configuration described herein.

The heat exchanger 300-2 is configured to reduce the temperature of the enclosure 200-2 via fluid flowing through the interior fluid system and the exterior fluid system. Specifically, fluid (e.g., gas, water, coolant, among others) flowing through the heat exchanger 300-2 absorbs heat from the enclosure 200-2, thereby reducing temperature of the enclosure 200-2.

In one form, the interior fluid system is provided by the interior fluid conduits 336 provided in the chamber 342 within the housing 340, the inlet plenum 330, the interior fluid inlet 326, and one or more apertures of the tube sheet 334. During operation, fluid flows through the interior fluid inlet 326 and the inlet plenum 330, where it enters the interior fluid conduits 336 via the apertures of the tube sheet 334. Fluid through the interior fluid system, which may be referred to as interior fluid, then exits the heat exchanger 300-2 via the one or more apertures of the tube sheet 334, the outlet plenum 332, and the interior fluid outlet 328.

In one form, the exterior fluid system is provided around the interior fluid system within the chamber 342 and includes the baffles 338 extending within the chamber 342, the exterior fluid inlet 320, and the exterior fluid outlet 322. During operation, fluid enters the chamber 342 via the exterior fluid inlet 320 and flows through the chamber 342 in accordance with a flow path defined by the arrangement of the baffles 338 and exits the exterior fluid system via the exterior fluid outlet 322. Fluid flowing through the exterior fluid system may be referenced to as an external fluid. In one form, one or more pumps, conduits, and reservoirs (not shown) are fluidly coupled to the heat exchanger 300-2 to regulate the flow of the interior and exterior fluids into and out of the heat exchanger 300-2.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Spatial and functional relationships between elements are described using various terms, including "connected," "engaged," "coupled," "adjacent," "next to," "on top of," "above," "below," and "disposed." Unless explicitly being described as being "direct," when a relationship between first and second elements is described in the present disclosure, that relationship can be a direct relationship where no other intervening elements are present between the first and second elements, and can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heater system comprising:
a heater bundle comprising:
at least one heater assembly comprising a plurality of heater units, more than one of the heater units defining at least one independently controlled heating zone;
a plurality of power conductors electrically connected to the independently controlled heating zones;
means for determining temperature;
an enclosure;
at least one power switch disposed within the enclosure;
a temperature regulation device that cools the enclosure; and
at least one controller configured to provide a control signal to the at least one power switch such that the power switch modulates power to the independently controlled heating zones through the power conductors based on the determined temperature to provide a desired power output along a length of the at least one heater assembly,
wherein the enclosure is sealed from an outside atmosphere.

2. The heater system according to claim 1, wherein the temperature regulation device cools the enclosure using a liquid cooling medium.

3. The heater system according to claim 1, wherein the temperature regulation device cools the enclosure using forced air.

4. The heater system according to claim 3, wherein the forced air is provided inside the enclosure and outside the enclosure.

5. The heater system according to claim 1, wherein the temperature regulation device cools the enclosure using an interior fluid cooling flow and an external fluid cooling flow, each of the cooling flows being coupled by a heat exchanger.

6. The heater system according to claim 1, wherein the temperature regulation device is at least one of a thermoelectric element and a refrigeration system.

7. The heater system according to claim 1, wherein the plurality of power conductors extend into the enclosure and connected to the power switch within the enclosure.

8. The heater system according to claim 1, wherein the at least one controller is remote from the heater bundle and communicates with the at least one power switch through at least one of wirelessly and over the plurality of power conductors.

9. The heater system according to claim 1 further comprising a heat sink disposed proximate the at least one power switch.

10. A heater system comprising:
a heater bundle comprising:
at least one heater assembly comprising a plurality of heater units, more than one of the heater units defining at least one independently controlled heating zone;
a plurality of power conductors electrically connected to the independently controlled heating zones;
means for determining at least one of heating conditions and heating requirements;
an enclosure;
at least one power switch disposed within the enclosure;
a temperature regulation device that cools the enclosure; and
at least one controller configured to provide a control signal to the at least one power switch such that the power switch modulates power to the independently controlled heating zone through the power conductors based on the at least one of heating conditions and heating requirements to provide a desired power output along a length of the at least one heater assembly,
wherein the enclosure is sealed from an outside atmosphere.

11. The heater system according to claim 10, wherein the at least one controller is disposed within the enclosure.

12. The heater system according to claim 10, wherein the at least one controller is remote from the heater bundle and communicates with the at least one power switch through at least one of wirelessly and over the plurality of power conductors.

13. The heater assembly according to claim 10, wherein the at least one of heating conditions and heating requirements are selected from the group consisting of life of the heater units, reliability of the heater units, sizes of the heater units, costs of the heater units, local heater flux, characteristics and operation of the heater units, and entire power output.

14. The heater system according to claim 10 further comprising a heat sink disposed proximate the at least one power switch.

15. A heater system comprising:
a heater assembly comprising a plurality of heater units, more than one heater unit defining at least one independently controlled heating zone;
a plurality of power conductors electrically connected to the heater units;
an enclosure;
at least one power switch disposed within the enclosure;
a temperature regulation device that cools the enclosure; and
at least one controller configured to provide a control signal to the at least one power switch such that the power switch modulates power to the independently controlled heating zone through the power conductors based on at least one of heating conditions and heating requirements to provide a desired power output along a length of the heater assembly,
wherein the enclosure is sealed from an outside atmosphere.

16. The heater system according to claim 15 further comprising a means for determining temperature.

17. The heater system according to claim 15 further comprising a means for determining heating conditions or heating requirements.

18. An apparatus for heating fluid comprising:
a sealed housing defining an internal chamber and having a fluid inlet and a fluid outlet; and
the heater system according to claim 15, the heater assembly being disposed within the internal chamber of the housing,
wherein the heater assembly is adapted to provide a predetermined heat distribution to a fluid within the housing.

19. The heater system according to claim 15 further comprising a heat sink disposed proximate the at least one power switch.

* * * * *